US012779872B2

(12) United States Patent
Tanaka

(10) Patent No.: US 12,779,872 B2
(45) Date of Patent: Nov. 3, 2026

(54) LIQUID EJECTING HEAD

(71) Applicant: BROTHER KOGYO KABUSHIKI KAISHA, Nagoya (JP)

(72) Inventor: Taiki Tanaka, Yokkaichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 160 days.

(21) Appl. No.: 18/633,656

(22) Filed: Apr. 12, 2024

(65) Prior Publication Data

US 2024/0359479 A1 Oct. 31, 2024

(30) Foreign Application Priority Data

Apr. 27, 2023 (JP) ................................ 2023-072978

(51) Int. Cl.
*B41J 2/18* (2006.01)
*B41J 2/14* (2006.01)
*B41J 2/16* (2006.01)

(52) U.S. Cl.
CPC ................ *B41J 2/18* (2013.01); *B41J 2/161* (2013.01); *B41J 2002/14322* (2013.01); *B41J 2002/14467* (2013.01)

(58) Field of Classification Search
CPC .... B41J 2/18; B41J 2/161; B41J 2002/14322; B41J 2002/14467; B41J 2002/14419; B41J 2002/14459; B41J 2202/11; B41J 2202/12; B41J 2/14233
See application file for complete search history.

(56) References Cited

U.S. PATENT DOCUMENTS

2020/0307197 A1* 10/2020 Hirai ...................... B41J 2/1433
2020/0307213 A1 10/2020 Hirai et al.

FOREIGN PATENT DOCUMENTS

JP 2020168739 A 10/2020
JP 2020168853 A 10/2020

* cited by examiner

*Primary Examiner* — Lisa Solomon
(74) *Attorney, Agent, or Firm* — Element IP, PLC

(57) ABSTRACT

A liquid ejecting head includes a channel structure having a first channel group. The first channel group includes: a supply channel extending in a first direction from one end thereof provided with a supply port, a return channel extending in the first direction from one end thereof provided with a discharge port and arranged side by side with the supply channel in a second direction, first individual channels aligned in the first direction, a second individual channel having one end communicating with the supply channel and the other end communicating with the return channel, and a connecting channel connecting the other end in the first direction of the supply channel and the other end in the first direction of the return channel. The second individual channel causes liquid to flow from the supply channel to the return channel, without causing the liquid to be ejected outside.

10 Claims, 7 Drawing Sheets

LIQUID EJECTING HEAD

REFERENCE TO RELATED APPLICATIONS

This application claims priority from Japanese Patent Application No. 2023-072978 filed on Apr. 27, 2023. The entire content of the priority application is incorporated herein by reference.

BACKGROUND ART

There is a conventionally known head provided with a channel structure having a channel group. The channel group includes: a supply manifold (supply channel) extending in a first direction from one end thereof provided with a supply port; a return manifold (return channel) extending in the first direction from one end thereof provided with a return port (discharge port); a bypass channel (connecting channel) connecting the other end in the first direction of the supply manifold and the other end in the first direction of the return manifold; and a plurality of individual channels (first individual channels) each of which is connected to the supply manifold and the return manifold. Each of the plurality of individual channels includes a nozzle. Further, the channel group has dummy channels (second individual channels or third individual channels) each of which is connected to a location in the vicinity of the other end of the supply manifold and to a location in the vicinity of the other end of the return manifold.

In the above-described head, for example, in a case that ink is supplied from the supply port in a state that a differential pressure (the pressure in the supply port is greater than the pressure in the return port) is generated by a pump between the supply port and the return port, the supplied ink flows in the supply manifold along the first direction from the one end toward the other end. Afterwards, the ink flows through the bypass channel and flows in the return manifold along the first direction from the other end toward the one end, and is discharged from the return port. By such a flow of the ink, it is possible to discharge air bubbles present in each of the supply manifold and the return manifold.

SUMMARY

In the above-described head, the individual channels are formed, and the ink in the supply manifold flows to the return manifold via the individual channels. With this, the ink in the supply manifold is allowed to easily flow into the return manifold, which in turn also increases an amount of the ink flowing from the supply port to the supply manifold.

Further, although the above-described head is also provided with the dummy channels, the dummy channels are connected to the location in the vicinity of the other end, in the supply manifold, which is opposite to the one end provided with the supply port. Accordingly, the ink flowed into the supply manifold from the supply port is less likely to flow into the dummy channels due to a pressure loss in the supply manifold. Namely, even in a case that the dummy channels are provided, the amount of the ink flowing from the supply port to the supply manifold is hardly increased, and thus it is not possible to flow a large amount of the ink to the supply manifold and the return manifold.

It is although possible to allow a large amount of the ink to flow into the supply manifold and the return manifold by increasing the differential pressure between the supply port and the return port, there is such a fear that a positive or negative pressure generated in an ink meniscus of the nozzle might become too large and that the ink meniscus might be broken. In a case that the ink meniscus is broken, there arises such a problem that an air bubbles enter into the channels via the nozzle and/or that the ink leaks from the nozzle.

In view of the above-described situation, an object of the present disclosure is to provide a liquid ejecting head capable of flowing a large amount of the liquid to the supply channel and the return channel, without making the differential pressure between the supply port and the return port great.

A liquid ejecting head according to an aspect of the present disclosure includes a channel structure having a first channel group. The first channel group includes: a supply channel extending in a first direction from one end thereof provided with a supply port; a return channel extending in the first direction from one end thereof provided with a discharge port and arranged side by side with the supply channel in a second direction crossing the first direction; a plurality of first individual channels aligned in the first direction, each of the first individual channels having a nozzle, one end communicating with the supply channel and the other end communicating with the return channel; a second individual channel having one end communicating with the supply channel and the other end communicating with the return channel; and a connecting channel connecting the other end in the first direction of the supply channel and the other end in the first direction of the return channel. The second individual channel is configured to cause liquid to flow from the supply channel to the return channel, without causing the liquid to be ejected outside. The second individual channel is positioned between the one end and the other end of the supply channel, and at least one of the first individual channels is positioned, in the first direction, between the second individual channel and the other end of the supply channel.

A liquid ejecting head according to another aspect of the present disclosure includes a channel structure having a channel group. The channel group includes: a first supply channel extending in a first direction from one end thereof provided with a first supply port; a first return channel extending in the first direction from one end thereof provided with a first discharge port and arranged side by side with the first supply channel in a second direction crossing the first direction; a plurality of first individual channels aligned in the first direction, each of the first individual channels having a first nozzle, one end communicating with the first supply channel and the other end communicating with the first return channel; a second supply channel extending in the first direction from one end thereof provided with a second supply port and arranged side by side with the first supply channel in a third direction crossing the first direction; a second return channel extending in the first direction from one end thereof provided with a second discharge port and arranged side by side with the second supply channel in the second direction; a plurality of second individual channels aligned in the first direction, each of the second individual channels having a second nozzle, one end communicating with the second supply channel and the other end communicating with the second return channel; a first connecting channel connecting the other end in the first direction of the first supply channel and the other end in the first direction of the second return channel; a second connecting channel connecting the other end in the first direction of the second supply channel and the other end in the first direction of the first return channel; and a third individual channel which has one end communicating with the first supply channel and the other end communicating with the first return channel. The third individual channel is configured to cause liquid to flow from the first supply channel to the first return channel, without causing the liquid to be ejected outside. The third individual channel is positioned between the one end and the other end of the first supply channel, and at least one of the first individual channels is positioned, in the first direction, between the third individual channel and the other end of the first supply channel.

In the liquid ejecting head according to the aspect of the present disclosure, the supply channel and the return channel are connected not only via the first individual channels but also via the second individual channel. Further, the second individual channel is connected, in the first direction, to a part other than the location in the vicinity of the other end of the supply channel. This allows the liquid flowed into the supply channel from the supply port to easily flow also into the second individual channel. Accordingly, without making the differential pressure between the supply port and the discharge port great, it is possible to allow a large amount of the liquid to flow into the supply channel. As a result, it is possible to flow the large amount of the liquid to the supply channel and the return channel, while suppressing the increase in the positive or negative pressure generated in the liquid meniscus of the nozzle, thereby making it possible to easily discharge an air bubble from the supply channel and the return channel. In the liquid ejecting head according to the another aspect of the present disclosure, the first supply channel and the first return channels are connected not only via the first individual channels but also via the third individual channel. Further, the third individual channel is connected, in the first direction, to a part other than the location in the vicinity of the other end of the first supply channel. This allows the liquid flowed into the first supply channel from the first supply port to easily flow also into the third individual channel. Accordingly, without making the differential pressure between the first supply port and the first discharge port great, it is possible to allow a large amount of the liquid to flow into the first supply channel. As a result, it is possible to flow the large amount of the liquid to the first supply channel and the first return channel, while suppressing the increase in the positive or negative pressure generated in the liquid meniscus of the first nozzle, thereby making it possible to easily discharge an air bubble from the first supply channel and the first return channel.

DESCRIPTION

First Embodiment

Figure 1:
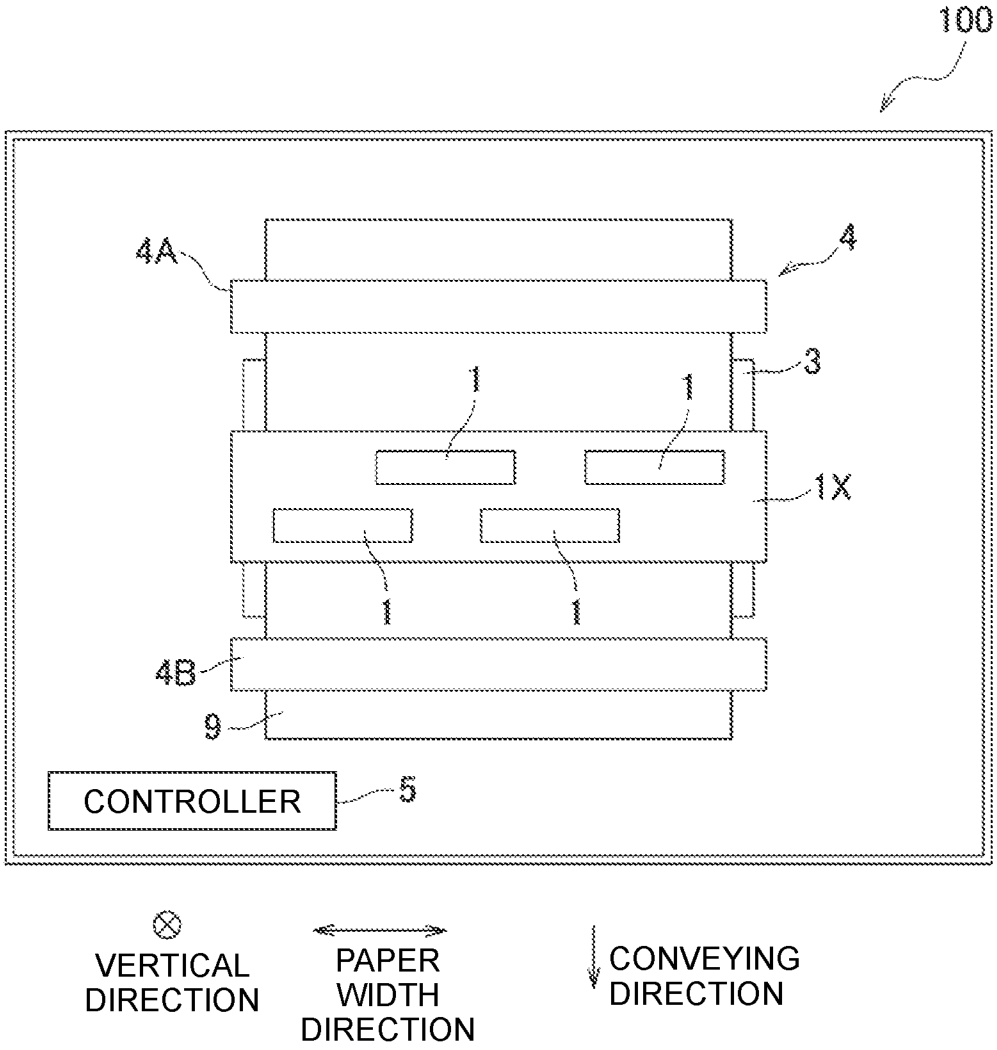
FIG. 1 is a plan view of a printer provided with a head according to an embodiment of the present disclosure.

First, an explanation will be given about the entire configuration of a printer 100 provided with a head 1 according to a first embodiment of the present disclosure, with reference to FIG. 1.

The printer 100 is provided with a head unit AX including four heads 1, a platen 3, a conveying mechanism 4 and a controller 5. A paper sheet (paper, sheet) 9 is placed on the upper surface of the platen 3.

The conveying mechanism 4 has two roller pairs 4A and 4B which are arranged while sandwiching the platen 3 therebetween in a conveying direction. In a case that a conveying motor (not depicted in the drawings) is driven by a control of the controller 5, the two roller pairs 4A and 4B rotate in a state that the two roller pairs 4A and 4B nip (pinch) the paper sheet 9 therebetween. With this, the paper sheet 9 is conveyed in the conveying direction.

The head unit 1X is long in a paper width direction (a "first direction" of the present disclosure: a direction orthogonal to both of the conveying direction and a vertical direction) and is of a line system in which an ink is ejected from a nozzle 21 (see FIGS. 2 and 3) with respect to the paper sheet 9 in a state that a position of the head unit 1X is fixed. Each of the four heads 1 is long in the paper width direction, and the four heads 1 are arranged in a staggered manner in the paper width direction.

The controller 5 includes a ROM, a RAM, and an ASIC. The ASIC executes a recording processing, etc., based on a program stored in the ROM. In the recording processing, the controller 5 controls a driver IC (not depicted in the drawings) of each of the heads 1 and a conveying motor (not depicted in the drawings) based on a recording instruction (including image data) inputted from an external apparatus such as a personal computer (PC), etc., thereby recording an image on the paper sheet 9.

Figure 2:
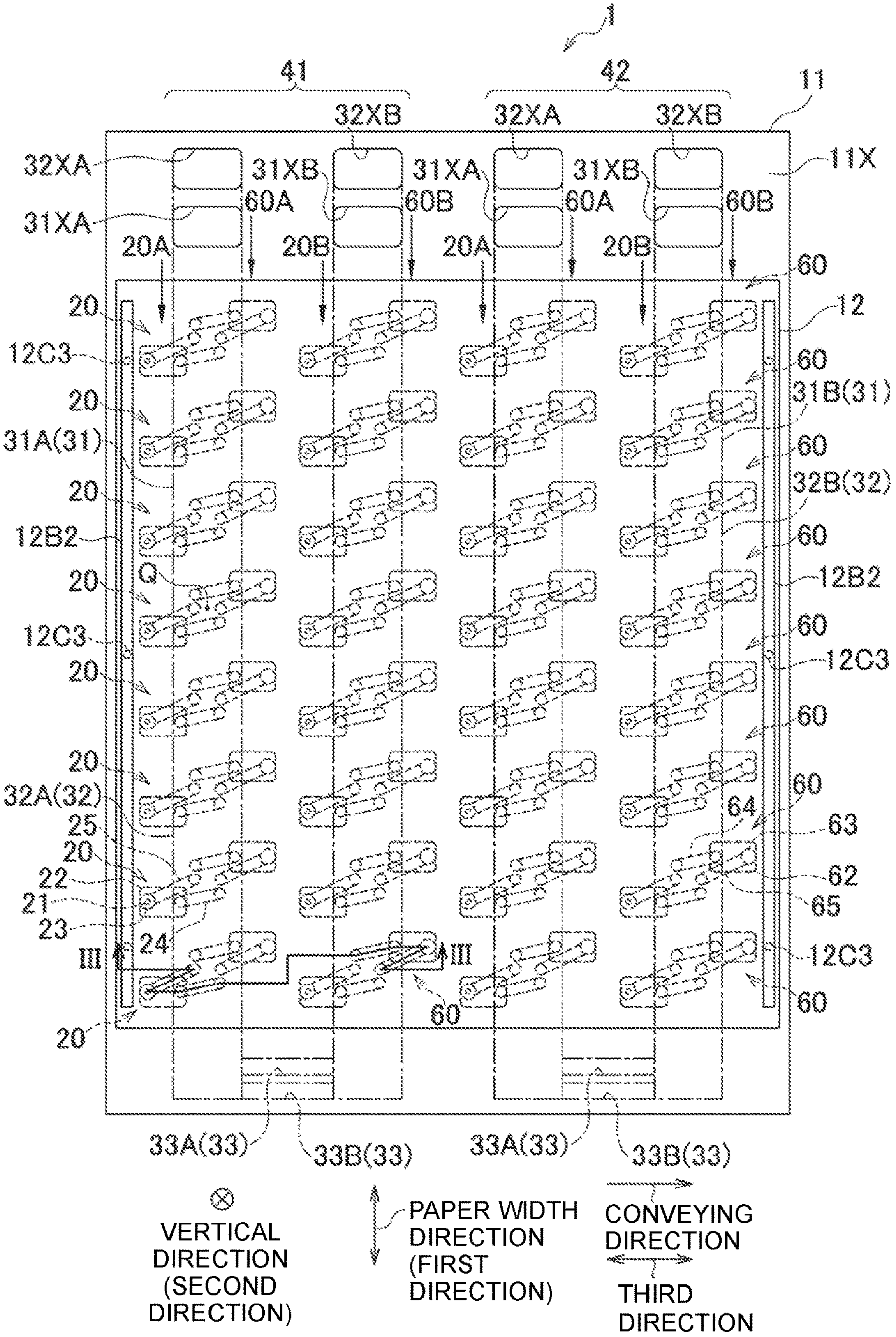
FIG. 2 is a plan view of the head depicted in FIG. 1.

Next, an explanation will be given about the configuration of each of the heads 1, with reference to FIGS. 2 and 3. As depicted in FIG. 2, each of the heads 1 has a channel structure 11 and an actuator member 12.

Figure 3:
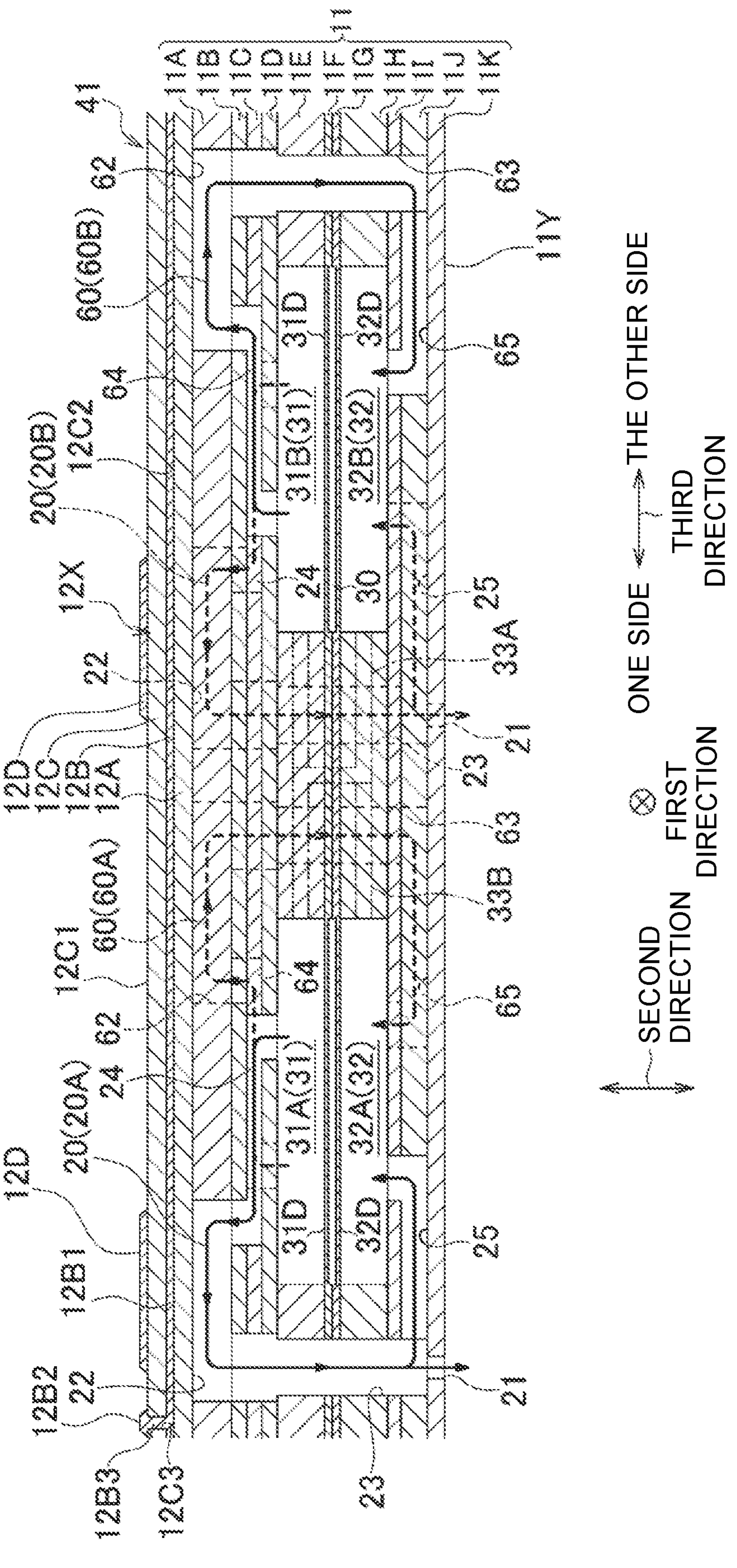
FIG. 3 is a cross-sectional view of the head taken along a III-III line of FIG. 2.

The channel structure 11 is constructed of eleven plates 11A to 11K which are stacked in the vertical direction (a "second direction" of the present disclosure) and adhered to one another, as depicted in FIG. 3. A plurality of through holes constructing a channel is formed in the plates 11A to 11K. Namely, the channel formed in the channel structure 11 is constructed by connecting the plurality of through holes to one another. The channel includes a plurality of individual channels 20, a supply channel 31, a return channel 32, a connecting channel 33 and a plurality of dummy individual channels 60.

As depicted in FIG. 2, two channel groups 41 and 42 are provided on the channel structure 11. The two channel groups 41 and 42 are arranged side by side in a direction parallel to the conveying direction (a "third direction" of the present disclosure; a width direction of each of the supply channel 31 and the return channel 32, and is a direction orthogonal to both of the first direction and the second direction). Since the two channel groups 41 and 42 in the present embodiment have a same configuration, the explanation will be given about the channel group 41, and any detailed explanation of the channel group 42 will be omitted.

As depicted in FIGS. 2 and 3, the channel group 41 is constructed of: the plurality of individual channels 20, two pieces of the supply channel 31, two pieces of the return channel 32, two pieces of the connecting channel 33 and the plurality of dummy individual channels 60. The individual channels 20 construct a first individual channel row 20A and a second individual channel row 20B each of which is aligned along the first direction. The first individual channel row 20A and the second individual channel row 20B are arranged side by side in the third direction. The dummy individual channels 60 (a "third individual channel" of the present disclosure) also construct a first dummy individual channel row 60A and a second dummy individual channel row 60B each of which is aligned along the first direction. The first dummy individual channel row 60A and the second dummy individual channel row 60B are arranged side by side in the third direction.

The two supply channels 31 of the channel group 41 are arranged side by side in the third direction, as depicted in FIG. 2. Each of the two supply channels 31 extends in the first direction (paper width direction). Further, the two supply channels 31 have a substantially same cross-sectional area (width×height). Further, the two return channels 32 of the channel group 41 are also arranged side by side in the third direction, as depicted in FIG. 2, and each of the two return channels 32 extends in the first direction. Further, the two return channels 32 have a substantially same cross-sectional area (width×height).

One supply channel 31A (on the left side in FIG. 2; a "first supply channel" of the present disclosure) of the two supply channels 31 and one return channel 32A (on the left side in FIG. 2; a "first return channel" of the present disclosure) of the two return channels 32 are arranged side by side in the second direction, as depicted in FIG. 3. The other supply channel 31B (on the right side in FIG. 2; a "second supply channel" of the present disclosure) of the two supply channels 31 and the other return channel 32B (on the right side in FIG. 2; a "second return channel" of the present disclosure) of the two return channels 32 are also arranged side by side in the second direction.

Individual channels 20 (a "plurality of first individual channels" of the present disclosure) constructing the first individual channel row 20A communicate with the supply channel 31A and the return channel 32A. Further, the individual channels 20 constructing the first individual channel row 20A are arranged, with respect to the supply channel 31A, on one side (the left side) in the third direction (the width direction of the supply channel 31A), and are aligned along the first direction at equal spacing distances therebetween, as depicted in FIG. 2.

Individual channels 20 ("a plurality of second individual channels" of the present disclosure) constructing the second individual channel row 20B communicate with the supply channel 31B and the return channel 32B. Further, the individual channels 20 constructing the second individual channel row 20B are arranged, with respect to the supply channel 31B, on one side (the left side) in the third direction (the width direction of the supply channel 31B), and are aligned along the first direction at equal spacing distances therebetween, as depicted in FIG. 2.

Dummy individual channels 60 constructing the first dummy individual channel row 60A communicate with the supply channel 31A and the return channel 32A. Further, the dummy individual channels 60 constructing the first dummy individual channel row 60A are arranged, with respect to the supply channel 31A, on the other side (the right side) in the third direction (the width direction of the supply channel 31A), and are aligned along the first direction at equal spacing distances therebetween, as depicted in FIG. 2. Further, the dummy individual channels 60 constructing the first dummy individual channel row 60A are arranged between one end (an upper end in FIG. 2) and the other end (a lower end in FIG. 2) in the first direction of the supply channel 31A with which the dummy individual channels 60 communicate.

Dummy individual channels 60 constructing the second dummy individual channel row 60B communicate with the supply channel 31B and the return channel 32B. Further, the dummy individual channels 60 constructing the second dummy individual channel row 60B are arranged, with respect to the supply channel 31B, on the other side (the right side) in the third direction (the width direction of the supply channel 31A), and are aligned along the first direction at equal spacing distances therebetween, as depicted in FIG. 2. Further, the dummy individual channels 60 constructing the second dummy individual channel row 60B are arranged between one end (an upper end in FIG. 2) and the other end (a lower end in FIG. 2) in the first direction of the supply channel 31B with which the dummy individual channels 60 communicate.

An arrangement pitch of the individual channels 20 constructing the first individual channel row 20A, an arrangement pitch of the individual channels 20 constructing the second individual channel row 20B, an arrangement pitch of the dummy individual channels 60 constructing the first dummy individual channel row 60A and an arrangement pitch of the dummy individual channels 60 constructing the second dummy individual channel row 60B are same.

In the present embodiment, the individual channels 20 and the dummy individual channels 60 connected to the supply channel 31A and the return channel 32A are arranged on mutually opposite sides in the third direction with respect to the supply channel 31A, while being shifted from one another by half the pitch in the first direction. Further, the individual channels 20 and the dummy individual channels 60 connected to the supply channel 31B and the return channel 32B are arranged on mutually opposite sides in the third direction with respect to the supply channel 31B, while being shifted from one another by half the pitch in the first direction.

Furthermore, as depicted in FIG. 2, one of the individual channels 20 constructing the first individual channel row 20A is arranged between the other end in the first direction (the lower end in FIG. 2) of the supply channel 31A and a dummy individual channel 60, which is included in the dummy individual channels 60 constructing the first dummy individual channel row 60A and which is closest to the other end in the first direction of the supply channel 31A. Moreover, as depicted in FIG. 2, one of the individual channels 20 constructing the second individual channel row 20A is arranged between the other end in the first direction (the lower end in FIG. 2) of the supply channel 31B and a dummy individual channel 60, which is included in the dummy individual channels 60 constructing the second dummy individual channel row 60B and which is closest to the other end in the first direction of the supply channel 31B.

One connecting channel 33A (a "first connecting channel" of the present disclosure) of the two connecting channels 33 connects the other end in the first direction of the supply channel 31A and the other end in the first direction of the return channel 32B, as depicted in FIGS. 2 and 3. Further, the other connecting channel 33B (a "second connecting channel" of the present disclosure) of the two connecting channels 33 connects the other end in the first direction of the supply channel 31B and the other end in the first direction of the return channel 32A.

The supply channel 31A and the return channel 32A of the channel group 41 communicate with a sub tank (not depicted in the drawings) via, respectively, a supply port (a "first supply port" of the present disclosure) 31XA and a discharge port (a "first discharge port" of the present disclosure) 32XA communicating, respectively, with the one end in the first direction of the supply channel 31A and the one end in the first direction of the return channel 32A. The supply port 31XA and the discharge port 32XA are arranged side by side in the first direction. Each of the supply channel 31A and the return channel 32A extends in the first direction from an end thereof at which the supply port 31XA or the discharge port 32XA is provided.

Further, the supply channel 31B and the return channel 32B of the channel group 41 communicate with the sub tank (not depicted in the drawings) via, respectively, a supply port (a "second supply port" of the present disclosure) 31XB and a discharge port (a "second discharge port" of the present disclosure) 32XB communicating, respectively, with the one end in the first direction of the supply channel 31B and the one end in the first direction of the return channel 32B. The supply port 31XB and the discharge port 32XB are also arranged side by side in the first direction. Each of the supply channel 31B and the return channel 32B extends in the first direction from an end thereof at which the supply port 31XB or the discharge port 32XB is provided.

The two supply ports 31XA and 31XB, two discharge ports 32XA and 32XB are opened in an upper surface (a "surface" of the present disclosure) 11X of the channel structure 11 so as to correspond to each of the channel groups 41 and 42.

The sub tank communicates with a main tank configured to store the ink and stores the ink supplied from the main tank. In a case that a pump (not depicted in the drawings) is driven by a control of the controller 5, a predetermined differential pressure is generated between the supply ports 31XA and 31XB and the discharge ports 32XA and 32XB. In the present embodiment, positive pressure is generated in the supply ports 31XA and 31XB and negative pressure is generated in the discharge ports 32XA and 32XB. With this, the ink in the sub tank flows into each of the two supply channels 31A and 31B from one of the supply ports 31XA and 31XB, and the ink in each of the two return channels 32A and 32B returns to the sub tank from one of the discharge ports 32XA and 32XB. Note that it is allowable that a pressure generated in the supply ports 31XA and 31XB is made greater than a pressure generated in the discharge ports 32XA and 32XB, by the driving of the pump.

The ink flowing into the supply channel 31A is supplied to the respective individual channels 20 constructing the first individual channel row 20A and the respective dummy individual channels 60 constructing the first dummy individual channel row 60A (see FIG. 3) while moving in the supply channel 31A from the one end (an upper end in FIG. 2) toward the other end (a lower end in FIG. 2) in the first direction. The ink flowed out of the respective individual channels 20 and the respective dummy individual channels 60 flows into the return channel 32A. Further, the ink flowing into the supply channel 31B is supplied to the respective individual channels 20 constructing the second individual channel row 20B and the respective dummy individual channels 60 constructing the second dummy individual channel row 60B while moving in the supply channel 31B from the one end (an upper end in FIG. 2) toward the other end (a lower end in FIG. 2) in the first direction. The ink flowed out of the respective individual channels 20 and the respective dummy individual channels 60 flows into the return channel 32B.

Further, the ink which has reached the other end in the first direction (the lower end in FIG. 2) of the supply channel 31A passes through the connecting channel 33A and flows into the return channel 32B. The ink flowed into the return channel 32B moves in the return channel 32B from the other end toward the one end in the first direction (the upper end in FIG. 2), and is returned to the sub tank via the discharge port 32XB. Further, the ink which has reached the other end in the first direction (the lower end in FIG. 2) of the supply channel 31B passes through the connecting channel 33B and flows into the return channel 32A. The ink flowed into the return channel 32A moves in the return channel 32A from the other end toward the one end (the upper end in FIG. 2) in the first direction, and is returned to the sub tank via the discharge port 32XA.

As depicted in FIG. 3, each of the supply channels 31A and 31B is constructed a through hole formed in the plate 11E. Each of the return channels 32A and 32B is constructed a through hole formed in the plate 11H. A damper chamber 30 is provided between each of the supply channels 31A and 31B and one of the return channels 32A and 32B in the second direction. The damper chamber 30 is constructed of a recessed part formed in the plate 11F and a recessed part formed in the plate 11G. A bottom part of the recessed part in the plate 11F functions as a damper film 31D of each of the supply channels 31A and 31B. A bottom part of the recessed part in the plate 11G functions as a damper film 32D of each of the return channels 32A and 32B.

Each of the plurality of individual channels 20 includes a nozzle 21, a pressure chamber 22, a communicating channel 23, an inflow channel 24 and an outflow channel 25, as depicted in FIG. 3.

The nozzle 21 (a "first nozzle" and a "second nozzle" of the present disclosure) is constructed of a through hole formed in the plate 11K, and is opened in a lower surface 11Y of the channel structure 11. The pressure chamber 22 is constructed of a through hole formed in the plate 11A, and the pressure chamber 22 is opened in the upper surface 11X of the channel structure 11. The pressure chamber 22 has a substantially rectangular planar shape which is long in the third direction. With respect to the pressure chamber 22, the inflow channel 24 is connected to one end in the third direction of the pressure chamber 22, and the communicating channel 23 is connected to the other end in the third direction of the pressure chamber 22.

The communicating channel 23 is constructed of through holes formed, respectively, in the plates 11B to 11J, and extends in the second direction. The communicating channel 23 is arranged between the nozzle 21 and the pressure chamber 22 in the second direction, and connects the nozzle 21 and the pressure chamber 22 with each other.

The inflow channel 24 is constructed of through holes formed, respectively, in the plate 11B to 11D. The inflow channel 24 has an upper end connecting to the pressure chamber 22 and a lower end connecting to the supply channel 31. The outflow channel 25 is constructed of through holes formed, respectively, in the plate 11I and 11J. The outflow channel 25 has one end connecting to a lower end of the communicating channel 23 and the other end connecting to the return channel 32. Each of the inflow channel 24 and the outflow channel 25 has a width smaller than a width (a length in the first direction) of the pressure chamber 22, and functions as a throttle.

The ink supplied from the supply channel 31 to each of the individual channels 20 passes through the inflow channel 24 and flows into the pressure chamber 22, moves substantially horizontally in the pressure chamber 22, and flows into the communicating channel 23. The ink inflowed into the communicating channel 23 moves downward in the communicating channel 23; a part of the ink is ejected from the nozzle 21 and the remainder of the ink passes the outflow channel 25 and flows into the return channel 32.

Each of the plurality of dummy individual channels 60 includes a pressure chamber 62, a communicating channel 63, an inflow channel 64 and an outflow channel 65, as depicted in FIG. 3. The pressure chamber 62, the communicating channel 63, the inflow channel 64 and the outflow channel 65 have shapes and sizes which are similar to the shapes and sizes, respectively, of the pressure chamber 22, the communicating channel 23, the inflow channel 24 and the outflow channel 25 constructing each of the individual channels 20. Further, as depicted in FIG. 2, the pressure chamber 62, the communicating channel 63, the inflow channel 64 and the outflow channel 65 constructing each of the dummy individual channels 60 are arranged symmetrically about a point Q with respect to the pressure chamber 22, the communicating channel 23, the inflow channel 24 and the outflow channel 25 constructing one of the individual channels 20 communicating with a same supply channel 31 with which each of the dummy individual channels 60 communicate. The point Q in the present embodiment is positioned in the vicinity of an right upper part of each of the individual channels 20 and on a central line passing through a center in the third direction of the supply channel 31 with which each of the individual channels 20 communicates. In such a manner, each of the dummy individual channels 60 is formed to have a shape and a size which are similar to a part, of each of the individual channels 20, which does not include the nozzle 21. Note that for the convenience of the explanation, only a point Q corresponding to an individual channel 20, which is arranged in the vicinity of the center of the first individual channel row 20A of the channel group 41, is indicated in FIG. 2.

Further, each of the dummy individual channels 60 is constructed so that a difference between a first channel resistance from one end (the lower end of the inflow channel 24) up to the other end (the other end of the outflow channel 25) of each of the individual channel 20 and a second channel resistance from one end (the lower end of the inflow channel 64) up to the other end (the other end of the outflow channel 65) of each of the dummy individual channel 60 is within 10% of the first channel resistance.

The ink supplied from the supply channel 31 to each of the dummy individual channels 60 passes through the inflow channel 64 and flows into the pressure chamber 62, moves substantially horizontally in the pressure chamber 62, and flows into the communicating channel 63. The ink flowed into the communicating channel 63 moves downward in the communicating channel 63, passes the outflow channel 65 and flows into the return channel 32.

By circulating the ink between the sub tank and the channel structure 11 in such a manner, discharge of air and/or prevention of any increase in the viscosity of the ink in the supply channel 31 and the return channel 32 formed in the channel structure 11 as well as in each of the individual channels 20 and each of the dummy individual channels 60 formed in the channel structure 11 are achieved. Further, in a case that the ink contains any sedimentary component (a component which might sediment, such as a pigment, etc.), such a sedimentary component is agitated, thereby preventing the sedimentation thereof.

As depicted in FIG. 3, the actuator member 12 includes a vibration plate 12A, a common electrode 12B, a piezoelectric layer 12C and a plurality of individual channels 12D, in this order from the lower side. The vibration plate 12A, the common electrode 12B and the piezoelectric layer 12C are arranged on the upper surface 11X of the channel structure 11, and cover all of a plurality of pieces of the pressure chamber 22 formed in the plate 11A. On the other hand, the plurality of individual electrodes 12D is arranged on an upper surface 12C1 ("one surface" of the present disclosure) of the piezoelectric layer 12C. Each of the plurality of individual electrodes 12D is provided on the pressure chamber 22 included in each of the individual channels 20, and overlap with the pressure chamber 22 in the second direction. Note that the individual electrode 12D is not arranged at a position overlapping, in the second direction, with each of the pressure chambers 62 included in one of the dummy individual channels 60. Namely, the individual electrode 12D is not provided on the pressure chamber 62 included in each of the dummy individual channels 60.

The common electrode 12B and the individual electrodes 12D are electrically connected to a driver IC (not depicted in the drawings). The common electrode 12B has a common electrode body 12B1, two contact point areas 12B2 and a plurality of linking parts 12B3. The common electrode body 12B1 is arranged on a lower surface 12C2 (a surface opposite to the upper surface 12C1) of the piezoelectric layer 12C. Further, the common electrode body 12B1 is arranged to straddle all the pressure chambers 22 and 62. The two contact point areas 12B2 are arranged outside in the third direction with respect to the supply channels 31 which are arranged at the outermost side, as depicted in FIG. 2, and are connected to an electric power supplying part via the driver IC (each of which is not depicted in the drawings). As depicted in FIG. 3, the two contact point areas 12B2 are arranged on the upper surface 12C1 of the piezoelectric layer 12C. Further, each of the contact point areas 12B2 extends in the first direction, as depicted in FIG. 2. A plurality of through holes 12C3 is formed in each of parts, of the piezoelectric layer 12C, which overlap with the contact point areas 12B2. Each of the linking parts 12B3 is arranged in one of the through holes 12C3, and electrically connects the common electrode body 12B1 and each of the contact point areas 12B2.

The driver IC maintains the potential of the common electrode 12B at the ground potential, whereas the driver IC changes the potential of each of the plurality of individual electrodes 12D. Specifically, the driver IC generates a driving signal based on a control signal from the controller 5, and applies the driving signal to each of the plurality of individual electrodes 12D. With this, the potential of each of the plurality of individual electrodes 12D is changed between a predetermined driving potential and the ground potential. In this situation, a part of the vibration plate 12A and a part of the piezoelectric layer 12C which are sandwiched between one of the plurality of individual electrodes 12D and one of the pressure chambers 22 (an actuator 12X) are deformed so as to project toward one of the pressure chambers 22, thereby changing the volume of the pressure chamber 22. With this, the pressure is applied to the ink inside the pressure chamber 22, thereby causing the ink to be ejected from the nozzle 21 corresponding to the pressure chamber 22. The actuator member 12 has a plurality of actuators 12X. The actuators 12X respectively correspond to the pressure chambers 22 of the individual channels 20. The actuators 12X are arranged along the first direction so as to respectively correspond to the nozzles 21, in other words, so as to respectively correspond to the individual channels 20, as depicted in FIG. 3.

As described above, according to the head 1 of the present embodiment, the supply channels 31A and 31B and the return channels 32A and 32B are connected not only via the individual channels 20, but also via the dummy individual channels 60. Further, in the first direction, each of the dummy individual channels 60 is connected to the part which is different from the other end of each of the supply channels 31A and 31B. More specifically, at least one of (at least one individual channel 20 of) the individual channels 20 is arranged between, in the first direction, each of the dummy individual channels 60 and the other end in the first direction of each of the supply channels 31A and 31B. Owing to this configuration, the ink flowed into the supply channels 31A and 31B from, respectively, the supply ports 31XA and 31XB flows easily also into the dummy individual channels 60. Namely, the amount of the ink flowing from the supply channels 31A and 31B to the return channels 32A and 32B becomes great. Accordingly, even without making the differential pressure between the supply ports 31XA and 31XB and the discharge ports 32XA and 32XB great, it is possible to flow a large amount of the ink to the supply channels 31A and 31B. As a result, it is possible to flow the large amount of the liquid to the supply channels 31A and 31B and the return channels 32A and 32B, while suppressing the increase in the positive or negative pressure generated in the ink meniscus of the nozzle, thereby making it possible to easily discharge an air bubble from the supply channels 31A and 31B and the return channels 32A and 32B.

Each of the channel groups 41 and 42 has the dummy individual channels 60. With this, it is possible to flow a larger amount of the ink to the supply channels 31A and 31B and the return channels 32A and 32B via the dummy individual channels 60.

In such a presumed case that the dummy individual channel 60 includes a nozzle, the ink might leak from the nozzle and/or the viscosity of the ink might be increased by the ink being dried via the nozzle, in some cases. In the head 1 of the present embodiment, since the dummy individual channel 60 does not includes the nozzle, it is possible to prevent the leakage of the ink and/or the increase in the viscosity of the ink.

Since the configurations of the two channel groups 41 and 42 are same, a total number of the individual channel 20 and the dummy individual channel 60 of the channel group 41 is same as a total number of the individual channel 20 and the dummy individual channel 60 of the channel group 42. With this, it is possible to make a difference, between the flow rate (flow amount) of the ink in the channel group 41 and the flow rate of the ink in the channel group 42 small. Accordingly, it is possible to make any unevenness or difference in the discharge of the air bubble between the channel groups 41 and 42 small.

Further, the channel group 41 includes the supply channel 31A, the return channel 32A, and the plurality of individual channels 20 and plurality of dummy individual channels 60 communicating with the supply channel 31A and the return channel 32A, and the channel group 42 includes the supply channel 31B, the return channel 32B, and the plurality of individual channels 20 and the plurality of dummy individual channels 60 communicating with the supply channel 31B and the return channel 32B. Further, in the channel group 41 and the channel group 42, the total number of the individual channel 20 and the dummy individual channel 60 are the same. Accordingly, it is possible to make the difference in the flow rate of the ink small between the two channel groups 41 and 42, and thereby to obtain an effect similar to the effect as described above.

Each of the individual channels 20 constructing the first individual channel row 20A, the individual channels 20 constructing the second individual channel row 20B, the dummy individual channels 60 constructing the first dummy individual channel row 60A and the dummy individual channels 60 constructing the second dummy individual channel row 60B are aligned at the same arrangement pitch in the first direction. With this, a separating distance in the first direction between two individual channels 20 which are adjacent to each other in the first direction is equal to a separating distance in the first direction between two dummy individual channels 60 which are adjacent to each other in the first direction. Owing to this, any unevenness in an adhesive margin among the plates becomes small among the individual channels 20 and among the dummy individual channels 60. As a result, it is possible to suppress occurrence of such a situation that the ink leaks from an intermediate part of each of the individual channels 20 and each of the dummy individual channels 60.

The individual channels 20 constructing each of the first individual channel row 20A and the second individual channel rows 20B are arranged on one side in the third direction (the left side in FIG. 2) with respect to the supply channel 31A or 31B with which the individual channels 20 communicate, and the dummy individual channels 60 constructing each of the first dummy individual channel row 60A and the second dummy individual channel rows 60B are arranged on the other side in the third direction (the right side in FIG. 2) with respect to the supply channel 31A or 31B with which the dummy individual channels 60 communicate. Namely, the dummy individual channels 60 are not arranged between the individual channels 20 constructing each of the first and second individual channel rows 20A and 20B. Accordingly, it is possible to easily arrange, at a desired pitch and in the first direction, the nozzles 21 included, respectively, in the individual channels 20 constructing each of the first and second individual channel rows 20A and 20B.

The difference between the first channel resistance in the individual channel 20 and the second channel resistance in the dummy individual channel 60 is within 10% of the first channel resistance. With this, the difference in the amount of the ink flowing in the individual channel 20 and the amount of the ink flowing in the dummy individual channel 60 becomes small. Accordingly, it is possible to perform the discharge of the air bubble and the recovery of the ink of which viscosity is increased, etc., effectively and without any unevenness in the individual channel 20 and the dummy individual channel 60.

The shape of the individual channel 20 and the shape of the dummy individual channel 60 are similar to each other, except for the nozzle 21. With this, any variation or unevenness in the size, except for the nozzle 21, is less likely to occur between the individual channel 20 and the dummy individual channel 60. Accordingly, the difference between the amount of the ink flowing in the individual channel 20 and the amount of the ink flowing in the dummy individual channel 60 becomes small. Thus, it is possible to perform the discharge of the air bubble and the recovery of the ink of which viscosity is increased, etc., effectively and without any unevenness in the individual channel 20 and the dummy individual channel 60.

Second Embodiment

Next, a head 201 according to a second embodiment of the present disclosure will be explained, with reference to FIGS. 4 and 5. A configuration of the second embodiment which is similar to that of the first embodiment is designated by the same reference numeral, and any explanation therefor will be omitted. A channel structure 211 of the head 201 in the second embodiment has three channel groups 241 to 243. The channel groups 241 and 242 are provided, respectively, on the both end sides in the third direction of the channel structure 211, and the channel group 243 is arranged in the center in the third direction of the channel structure 211, namely, between the two channel groups 241 and 242.

The channel groups 241 and 242 are similar to the channel groups 41 and 42 of the first embodiment, although the channel groups 241 and 242 each includes dummy individual channels 260, rather than the dummy individual channels 60. The dummy individual channels 260 constructing each of first and second dummy individual channel rows 260A and 260B are similar to the dummy channels 60 of the first embodiment, although each of the dummy individual channels 260 includes a nozzle 21 which is similar to the nozzle 21 included in each of the individual channels 20. Further, as depicted in FIG. 5, the individual electrode 12D is not provided at a position overlapping, in the second direction, with a pressure chamber 62 included in each of the dummy individual channels 260. Namely, although the dummy individual channel 260 has a shape which is same as the shape of the individual channel 20, the actuator 12X corresponding to the pressure chamber 62 is not provided on an actuator member 212. With this, an ejecting energy for causing the ink to be ejected from the nozzle 21 is not imparted to the ink in the pressure chamber 62. Note that since not only the channel group 241 and 242 but also the channel group 243 is formed in the channel structure 211 of the second embodiment, the actuator member 212 in the second embodiment has a width in the third direction which is greater than that of the actuator member 12 in the first embodiment. Further, the individual electrode 12D is provided at a position overlapping, in the second direction, with the pressure chamber 20 of each of the individual channels 20. Namely, a plurality of actuators 12X each of which corresponds to one of the pressure chambers 22 included in one of the individual channels 20 is provided on the actuator member 212.

The channel group 243 has a configuration similar to a configuration having the dummy individual channels 260 omitted from the channel group 241, and the channel group 243 has supply channels 31A and 31B, return channels 32A and 32B, individual channels 20 constructing the first individual channel row 20A, individual channels 20 constructing the second individual channel row 20B and connecting channels 33A and 33B.

Figure 4:
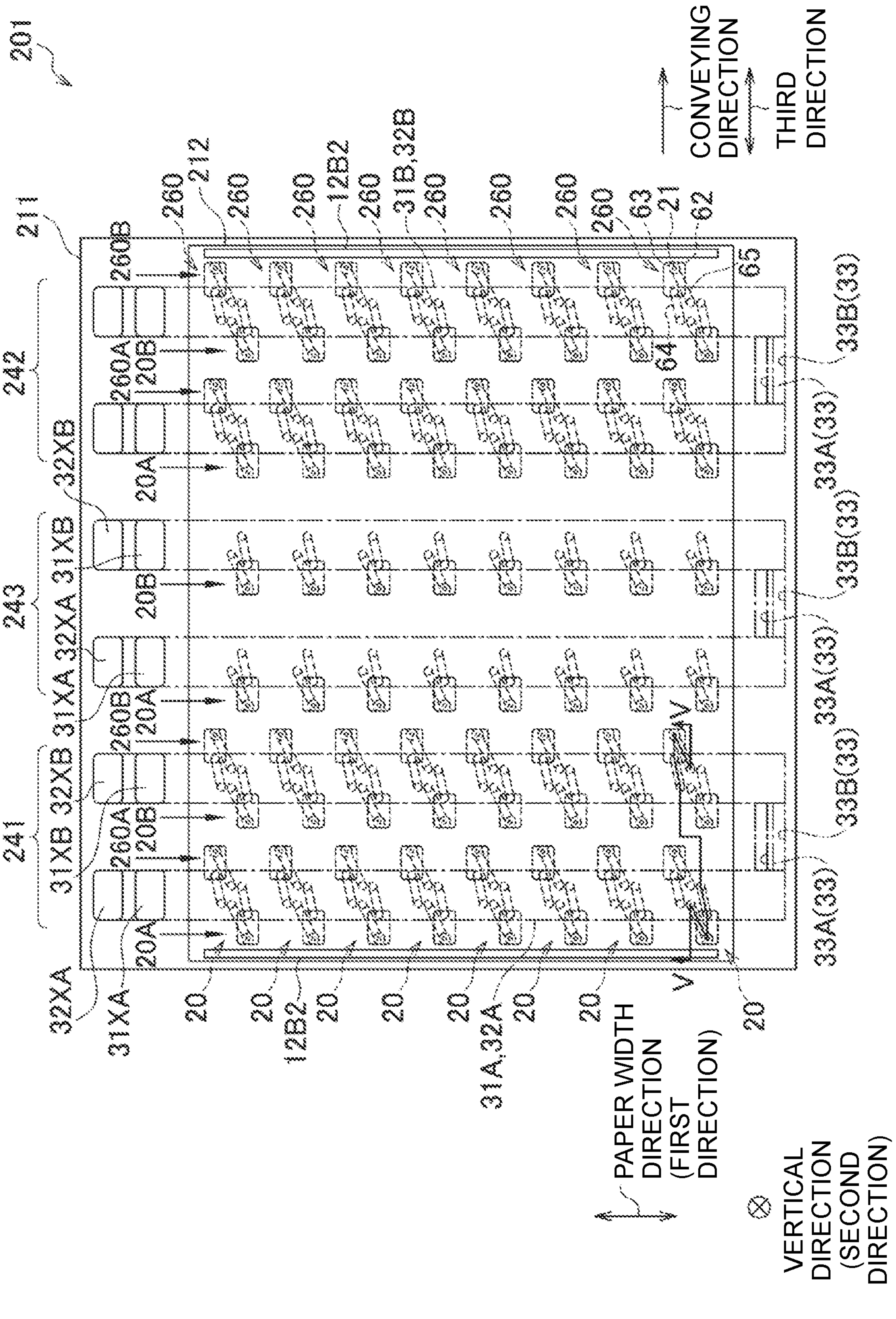
FIG. 4 is a plan view of a head according to another embodiment of the present disclosure.
Figure 5:
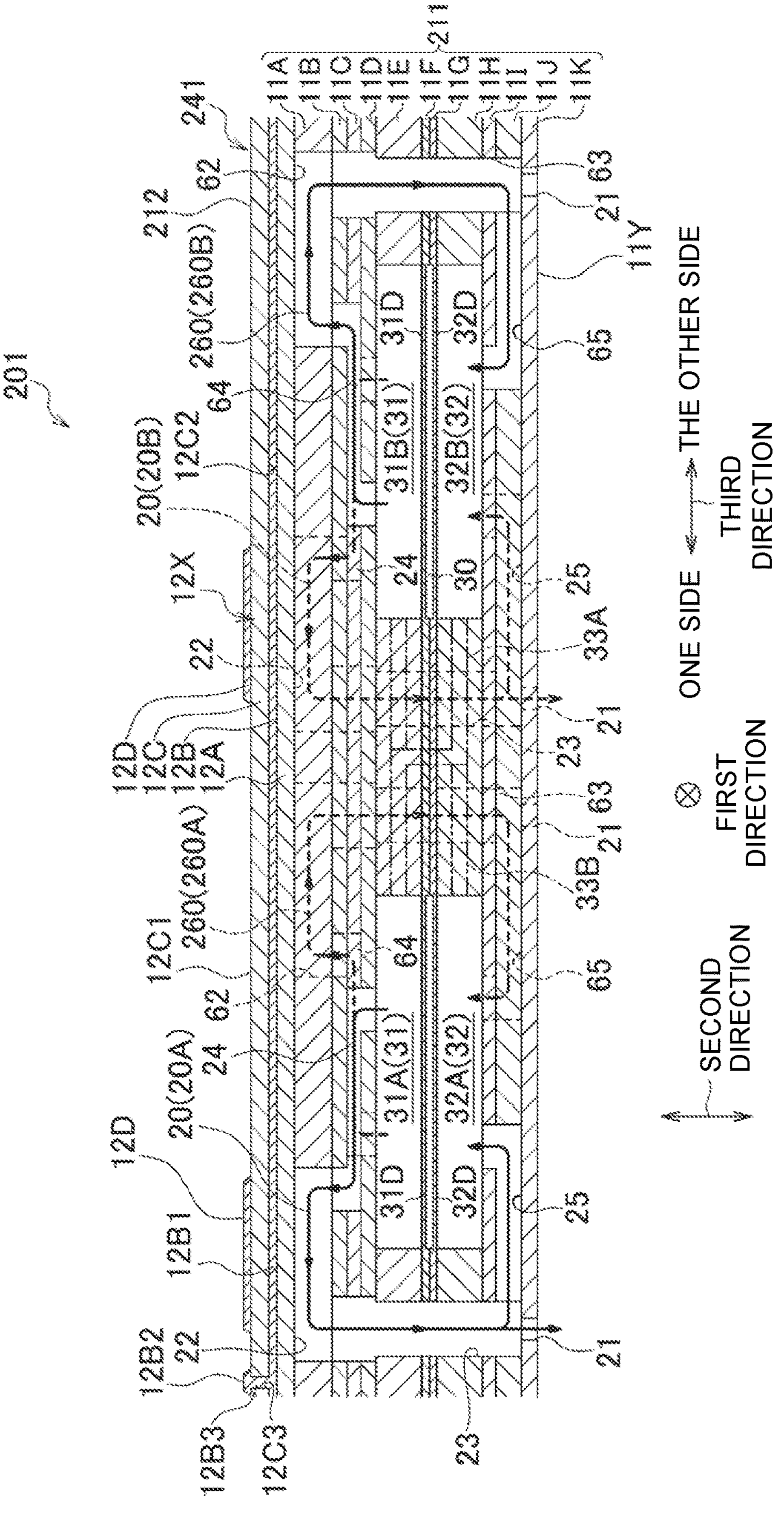
FIG. 5 is a cross-sectional view of the head taken along a V-V line of FIG. 4.

In the second embodiment, as depicted in FIG. 4, each of the channel groups 241 and 242 which is adjacent to one of the two contact point areas 12B2 in the third direction has the dummy individual channels 260, and the channel group 243 which is apart from the two contact point areas 12B2 in the third direction farther than the channel groups 241 and 242 is not provided with the dummy individual channels 260. Namely, the number of the dummy individual channel 260 provided on each of the channel groups 241 and 242 is greater than the number of the dummy individual channel 260 provided on the channel group 243. With this, even in a case that the differential pressure between the supply ports 31XA and 31XB and the discharge ports 32XA and 32XB is same among the channel groups 241, 242 and 243, it is possible to cause a larger amount of the ink to flow into the supply channels 31A and 31B of each of the channel groups 241 and 242 than to the supply channels 31A and 31B of the channel group 243. Each of the two contact point areas 12B2 has a heat value (calorific power) which is relatively high due to supply of the electric power. Due to tis, parts, of the channel structure 211, each of which is in the vicinity of one of the two contact point area 12B2, namely, the both end parts in the third direction of the channel member 211 are heated. In the channel groups 241 and 242 which are close, respectively, to the two contact point areas 12B2, however, it is possible to make the amount of the ink supplied with respect to the supply channels 31A and 31B great, and thus the heating of the channel structure 211 by the heat generated by the two contact point areas 12B2 can be effectively cooled. As a result, it is possible to suppress any increase in the viscosity of the ink in the channel groups 241 and 242. Note that in a configuration, in the second embodiment, similar to that in the above-described first embodiment, it is possible to obtain a similar effect to the effect obtained in the first embodiment.

Since the shape of the dummy individual channel 260 and the shape of the individual channel 20 in the second embodiment are same and symmetric with respect to a point, the difference between the first channel resistance of the individual channel 20 and the second channel resistance of the dummy individual channel 260 is within 10% of the first channel resistance. Owing to this, it is possible to obtain a similar effect to the effect obtained in the first embodiment.

As a modification, it is allowable to provide the actuator 12X at a position overlapping with the pressure chamber 62 of each of the dummy individual channels 260 constructing the first dummy individual channel row 260A. Namely, it is allowable to provide such a configuration that the ejecting energy for ejecting the ink from the nozzle 21 can be imparted to the ink inside the pressure chamber 62, and that the dummy individual channels 260 constructing the first dummy individual channel row 260A can be made as individual channels 20 capable of ejecting the ink from the nozzles 21. Also in this configuration, the total number of the individual channel 20 and the dummy individual channel 260 of the channel group 241 is same as the total number of the individual channel 20 and the dummy individual channel 260 of the channel group 242. With this also, it is possible to make the difference between the flow rate of the ink supplied to the channel group 241 and the flow rate of the ink supplied to the channel group 242 small. Accordingly, it is possible to make any unevenness or difference in the discharge of the air bubble between the channel groups 241 and 242 small.

Third Embodiment

Figure 6:
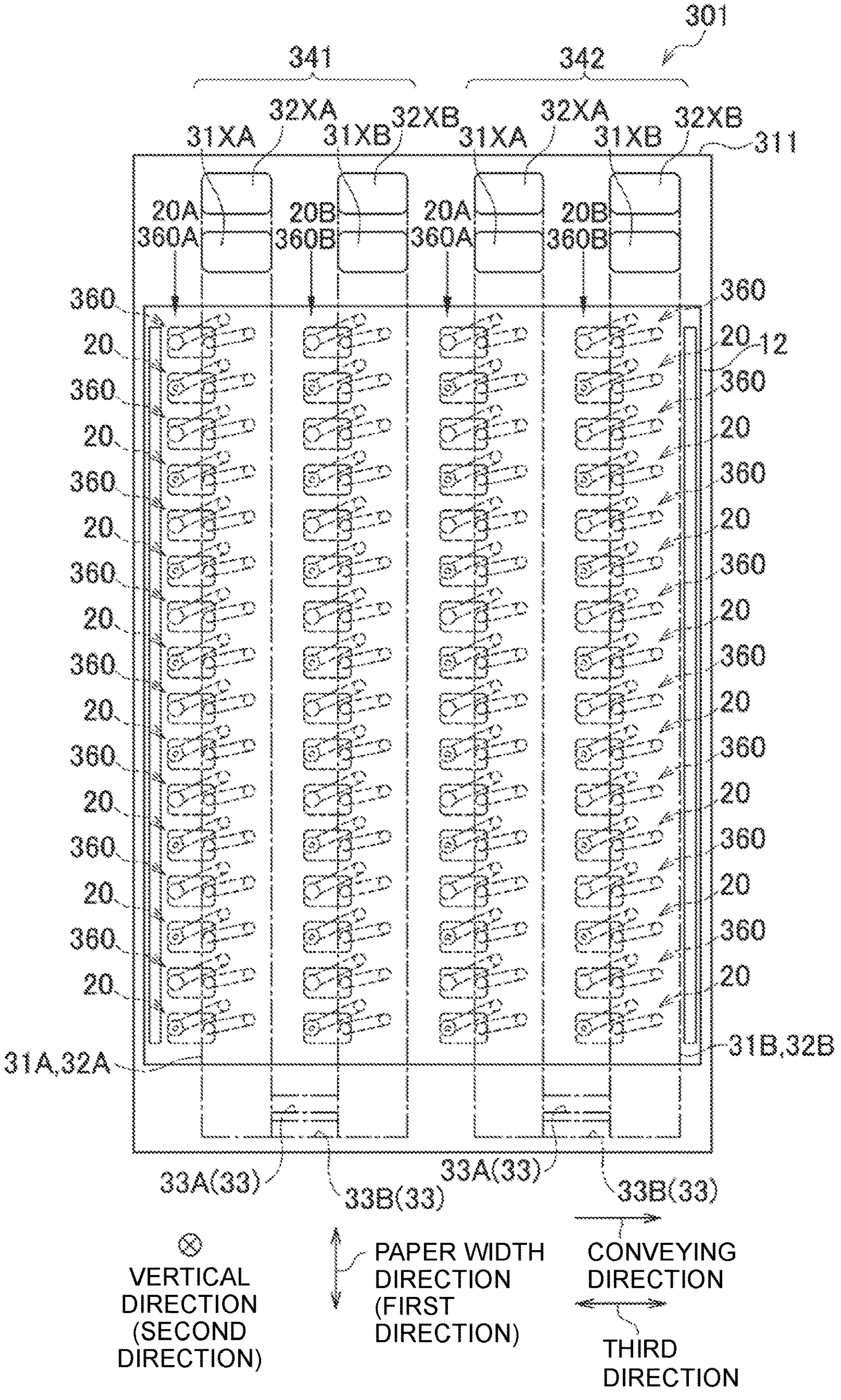
FIG. 6 is a plan view of a head according to still another embodiment of the present disclosure.

Next, a head 301 according to a third embodiment of the present disclosure will be explained, with reference to FIG. 6. A configuration of the third embodiment which is similar to that of the first embodiment is designated by the same reference numeral, and any explanation therefor will be omitted. A channel structure 311 of the head 301 in the third embodiment has two channel groups 341 and 342.

In each of the channel groups 341 and 342, a first dummy individual channel group 360A is arranged at a position in the third direction which is same as the position in the third direction of the first individual channel row 20A, and a second dummy individual channel group 360B is arranged at a position in the third direction same as the position in the third direction of the second individual channel row 20B. Namely, dummy individual channels 360 constructing the first dummy individual channel row 360A are arranged on one side in the third direction (on the left side in FIG. 6), with respect to the supply channel 31A, which is same as the side on which the individual channels 20 constructing the first individual channel row 20A are arranged, and communicate with the supply channel 31A and the return channel 31B. Further, dummy individual channels 360 constructing the second dummy individual channel row 360B are arranged, with respect to the supply channel 31B, on one side in the third direction (on the left side in FIG. 6), which is same as the side on which the individual channels 20 constructing the second individual channel row 20B are arranged, and communicate with the supply channel 31B and the return channel 31B. Furthermore, the individual dummy channels 360 constructing each of the first dummy individual channel row 360A and the second dummy individual channel row 360B have a shape and a size which are same as the shape and the size of the individual channels 20 which are not provided with the nozzles 21.

Moreover, an arrangement pitch in the first direction of the individual channels 20 constructing the first individual channel row 20A and an arrangement pitch in the first direction of the dummy individual channels 360 constructing the first dummy individual channel row 360A are same, while each of the dummy individual channels 360 is arranged to be shifted, by half the pitch in the first direction, with respect to one of the individual channels 20. With this, the individual channels 20 constructing the first individual channel row 20A and the dummy individual channels 360 constructing the first dummy individual channel row 360A are arranged alternately and at equal spacing distances therebetween along the first direction. Note that the individual channels 20 constructing the second individual channel row 20B and the dummy individual channels 360 constructing the second dummy individual channel row 360B are also arranged alternately and at equal spacing distances therebetween along the first direction. The individual channels 20 and the dummy individual channels 360 are arranged alternately and at equal spacing distances therebetween along the first direction in such a manner. Accordingly, any unevenness or difference in an adhesive allowance (adhesive margin) among the plates becomes small among the individual channels 20 and among the dummy individual channels 360. As a result, it is possible to suppress such a situation that the ink leaks from at an intermediate part of each of the individual channels 20 and each of the dummy individual channels 360.

In the third embodiment, the individual channels 20 and the dummy individual channels 360 which communicate with the supply channel 31A are arranged on the one side in the third direction with respect to the supply channel 31A with which the individual channels 20 and the dummy individual channels 360 communicate. Similarly, the individual channels 20 and the dummy individual channels 360 which communicate with the supply channel 31B are arranged on the one side in the third direction with respect to the supply channel 31B with which the individual channels 20 and the dummy individual channels 360 communicate. In the head 1 of the first embodiment, the individual channels 20 and the dummy individual channels 60 which communicate with the supply channel 31A are arranged, respectively, on the mutually opposite sides in the third direction with respect to the supply channel 31A. Further, the individual channels 20 and the dummy individual channels 60 which communicate with the supply channel 31B are arranged, respectively, on the mutually opposite sides in the third direction with respect to the supply channel 31B. In this case, there is required, for example, a space for providing the dummy individual channels 60 communicating with the supply channel 31B of the channel group 42 is required, on the right side in FIG. 2, with respect to the supply channel 31B of the channel structure 11. In the third embodiment, however, there is no need for a space for providing the dummy individual channels 360, on the right side in FIG. 6, with respect to the supply channel 31B of the channel group 342. Owing to this, it is possible to make a width in the third direction of the head 301 small.

In a configuration, in the third embodiment, similar to that in the above-described first and second embodiments, it is possible to obtain a similar effect to the effect obtained in the first and second embodiments.

As modifications, it is allowable that the individual channels 20 and the dummy individual channels 360 communicating with each of the supply channel 31A and 31B are not arranged alternately and/or at the equal spacing distances therebetween in the first direction. It is allowable to provide one or more pieces of the dummy individual channel 360 on each of the channel groups 341 and 342. In such a case, it is allowable that at least one individual channel 20 is arranged, in the first direction, between one or more pieces of the dummy individual channel 360 and the other end in the first direction of each of the supply channels 31A and 31B.

Fourth Embodiment

Figure 7:
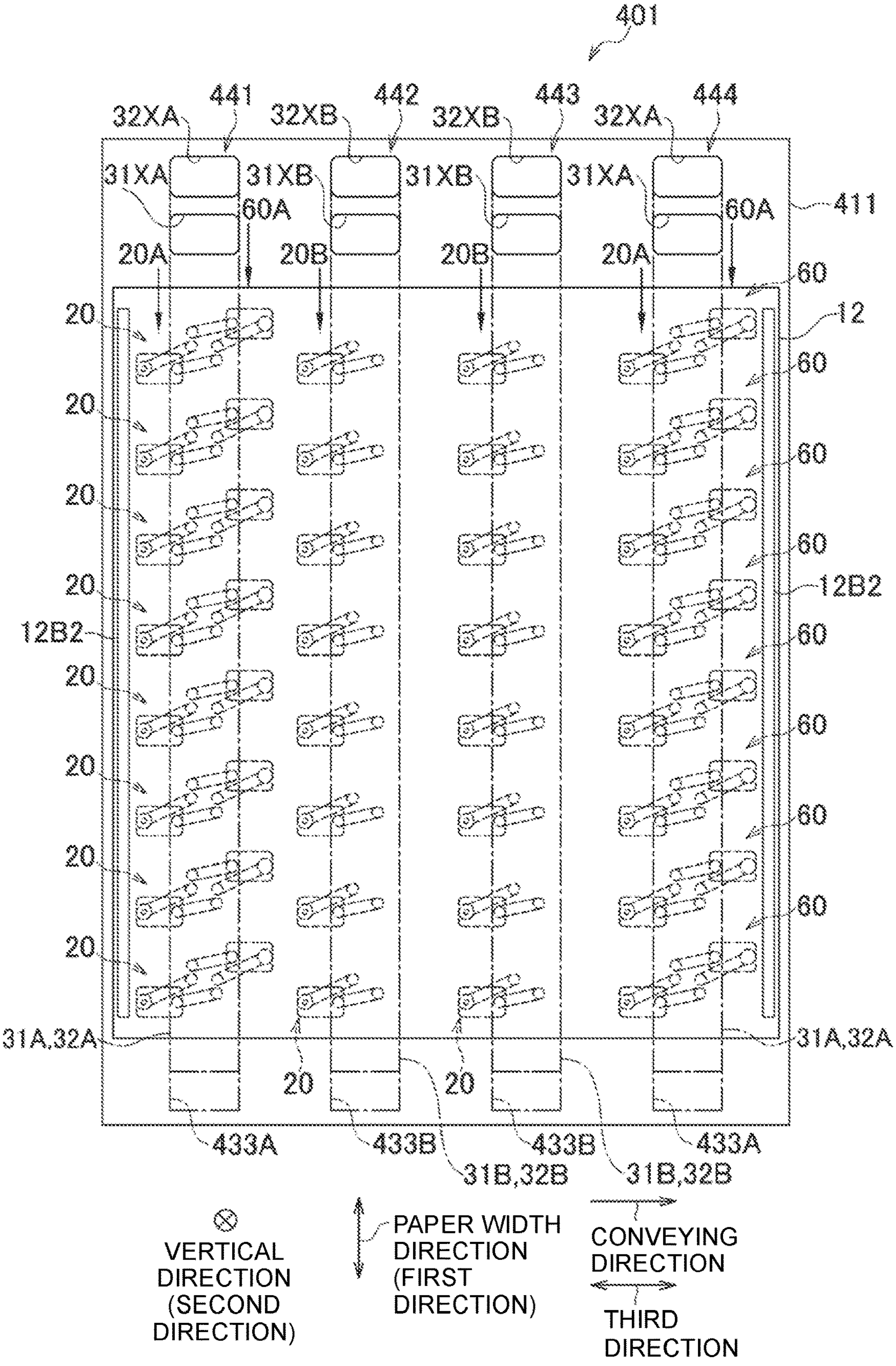
FIG. 7 is a plan view of a head according to yet another embodiment of the present disclosure.

Next, a head 401 according to a fourth embodiment of the present disclosure will be explained, with reference to FIG. 7. A configuration of the fourth embodiment which is similar to that of the first embodiment is designated by the same reference numeral, and any explanation therefor will be omitted. A channel structure 411 of the head 401 in the fourth embodiment has four channel groups 441 to 444. These channel groups 441 to 444 are arranged side by side in order in the third direction. The channel group 441 (a "first channel group" of the present disclosure) is constructed of individual channels 20 (the "plurality of first individual channels" of the present disclosure) constructing a first individual channel row 20A, a supply channel 31A, a return channel 32A, a connecting channel 433A and dummy individual channels 60 (a "second individual channel" of the present disclosure) constructing a first dummy individual channel row 60A.

The channel group 442 (a "second channel group" of the present disclosure) is constructed of individual channels 20 constructing a second individual channel row 20B, a supply channel 31B, a return channel 32B and a connecting channel 433B. Namely, the channel group 442 has a configuration substantially same as a configuration wherein the dummy individual channels 60 constructing the second dummy individual channel row 60B are omitted from the channel group on the right side part in FIG. 2 of the above-described channel group 41. The connecting channel 433B extends in the second direction and connects the other end in the first direction of the supply channel 31B and the other end in the first direction of the return channel 32B.

Since the channel group 443 has a configuration similar to the configuration of the channel group 442, and thus a configuration of the channel group 443 which is similar to that of the channel group 442 is designated by the same reference numeral, and any explanation therefor will be omitted. Since the channel group 444 has a configuration similar to the configuration of the channel group 441, and thus a configuration of the channel group 444 which is similar to that of the channel group 441 is designated by the same reference numeral, and any explanation therefor will be omitted.

Also in the fourth embodiment, each of the channel groups 441 and 444 which is adjacent to one of two contact point areas 12B2 in the third direction has the dummy individual channels 60, and each of the channel group 442 and 443 which is apart from one of the two contact point areas 12B2 in the third direction farther than the channel groups 441 and 444 is not provided with the dummy individual channels 60. Namely, the number of the dummy individual channel 60 provided on each of the channel groups 441 and 444 is greater than the number of the dummy individual channel 60 provided on each of the channel groups 442 and 443. With this, even in a case that the differential pressure between the supply ports 31XA and 31XB and the discharge ports 32XA and 32XB is same among the channel groups 441 to 444, it is possible to cause a larger amount of the ink to the supply channels 31A and 31B of each of the channel groups 441 and 444 than to the supply channels 31A and 31B of each of the channel groups 442 and 443. Accordingly, in a similar manner to the above-described second embodiment, since it is possible to make the amount of the ink supplied with respect to the supply channels 31A and 31B great in the channel groups 441 and 444 which are close, respectively, to the two contact point areas 12B2, the heating of the channel structure 411 by the heat generated by the two contact point areas 12B2 can be effectively cooled. As a result, it is possible to suppress any increase in the viscosity of the ink in the channel members 441 and 444.

Further, in each of the channel groups 441 and 444, the individual channels 20 constructing the first individual channel row 20A are arranged on one side in the third direction (the left side in FIG. 7) with respect to the supply channel 31A, and the dummy individual channels 60 constructing the first dummy individual channel row 60A are arranged on the other side in the third direction (the right side in FIG. 7) with respect to the supply channel 31A. Namely, the dummy individual channels 60 are not arranged between the individual channels 20 constructing the first individual channel row 20A. Accordingly, it is possible to easily arrange, at a desired pitch and in the first direction, the nozzles 21 included, respectively, in the individual channels 20 constructing the first individual channel rows 20A. Note that in a configuration, in the fourth embodiment, similar to that in the above-described first embodiment, it is possible to obtain a similar effect to the effect obtained in the first embodiment.

As a modification, it is allowable that each of the dummy individual channels 60 in the fourth embodiment has a nozzle 21. With this, the shape and size of the dummy individual channels 60 and the shape and size of the individual channels 20 same and symmetric with respect to a point. By making the difference between the first channel resistance and the second channel resistance be within 10% of the first channel resistance, it is possible to obtain a similar effect to the effect as described above.

As another modification, it is allowable that the channel group 442 has the dummy individual channels 60 constructing the above-described second dummy individual channel row 60B. With this, the total number of the individual channel 20 and the dummy individual channel 60 are the same in the channel group 441 and the channel group 442. Owing to this, it is possible to make the difference between the flow rate of the ink in the channel group 441 and the flow rate of the ink in the channel group 442 small, thereby making it possible to make any unevenness or difference in the discharge of the air bubble between the channel groups 441 and 442 small.

As yet another modification, it is allowable that the channel group 442 has individual channels 20 of which number is same as the total number of the individual channel 20 and the dummy individual channel 60 of the channel group 441. Owing to this, it is possible to make the difference between the flow rate of the ink supplied to the channel group 441 and flow rate of the ink supplied to the channel group 442 small, thereby making it possible to make any unevenness or difference in the discharge of the air bubble between the channel groups 441 and 442 small.

As yet still another modification, it is allowable to provide one or more pieces of the dummy individual channel 60 on each of the channel groups 441 and 444. In such a case, at least one individual channel 20, of the individual channels 20, is arranged, in the first direction, between one or more pieces of the dummy individual channel 60 and the other end in the first direction of the supply channel 31A.

Here, it is allowable that the supply channel 31A and the return channel 32A of each of the channel groups 341 and 342 in the above-described third embodiment are connected by the connecting channel 433A of the fourth embodiment, rather than by the connecting channel 33A, and that the supply channel 31B and the return channel 32B of each of the channel groups 341 and 342 in the above-described third embodiment are connected by the connecting channel 433B of the fourth embodiment, rather than by the connecting channel 33B. With this, each of the two channel groups 341 and 342 has two channel groups for each of the supply channels 31. Also in such a configuration, it is possible to make the size in the width direction of the head small, in a similar manner as described above.

Further, also in this modification, the individual channels 20 and the dummy individual channels 360 are arranged alternately and at equal spacing distances therebetween along the first direction. Accordingly, any unevenness or difference in an adhesive allowance (adhesive margin) among the plates becomes small among the individual channels 20 and among the dummy individual channels 360. As a result, it is possible to suppress occurrence of such a situation that the ink leaks from an intermediate part of each of the individual channels 20 and each of the dummy individual channels 360. Furthermore, also in this modification, it is allowable that the individual channels 20 and the dummy individual channels 360 communicating with each of the supply channel 31A and 31B are not arranged alternately and/or at the equal spacing distances therebetween in the first direction. In each of the channel groups 341 and 342, it is allowable to provide one or more pieces of the dummy individual channel 360. In such a case, it is allowable that at least one individual channel 20, of the individual channels 20, is arranged, in the first direction, between one or more pieces of the dummy individual channel 360 and the other end in the first direction of each of the supply channels 31A and 31B.

In the foregoing, although the embodiments of the present disclosure have been explained, the present disclosure is not limited to or restricted by the above-described embodiments; a various kinds of change can be made to the present disclosure within the range described in the claims.

Also in the above-described first and second embodiments, it is allowable to provide one or more pieces of the dummy individual channel 60, 260. In such a case, it is allowable that at least one individual channel 20, of the individual channels 20, is arranged, in the first direction, between one or more pieces of the dummy individual channel 60 and the other end in the first direction of each of the supply channels 31A and 31B. Similarly, it is allowable that at least one individual channel 20, of the individual channels 20, is arranged, in the first direction, between one or more pieces of the dummy individual channel 260 and the other end in the first direction of each of the supply channels 31A and 31B. Also in this configuration, it is possible to flow the large amount of the liquid to the supply channels 31A and 31B, thereby making it possible to obtain an effect similar to the effect as descried above.

It is allowable that the supply channel 31A and the return channel 32A are arranged side by side in the third direction. Namely, the supply channel 31A and the return channel 32A may be arranged side by side in a direction which is different from the second direction and which crosses the first direction.

It is allowable that the two supply ports 31XA and 31XB of the channel group 41 in the above-described first embodiment are constructed of one supply port. Further, it is also allowable that the two discharge ports 32XA and 32XB of the channel group 41 in the above-described first embodiment are constructed of one discharge port.

The shape of the individual channel 20 and the shape of the dummy individual channel 60 except for the nozzle 21 may be mutually different. Further, the shape of the individual channel 20 and the shape of the dummy individual channel 260 may be mutually different.

Further, it is allowable that either one of the first dummy individual channel row 60A and the second dummy individual channel row 60B in the first embodiment is not provided.

It is allowable that the piezoelectric layer 12C of the above-described actuator member 12 is provided on each of the plurality of individual electrodes 12D. Namely, the piezoelectric layer 12C may be formed in an island structure wherein the piezoelectric layer 12C is individually formed at a position overlapping with each of the pressure chambers 22 in the second direction.

It is allowable that the common electrode body 12B1 of the above-described common electrode 12B also have a plurality of branched parts each of which is individually formed so that at least a part thereof overlaps, in the second direction, with one of the pressure chambers 22, and a trunk part configured to link or connect the plurality of branched parts and to be electrically connected to each of the contact point area 12B2. Further, in the above-described embodiment, although two pieces of the contact point area 12B2 are provided, it is allowable that the contact point area 12B2 is provide as one piece of the contact point area 12B2 or three or more pieces of the contact point area 12B2. Furthermore, a plurality of pieces of the contact point area 12B2 are provided along the first direction.

The liquid ejecting head is not limited to a head of the line system, and may be a head of a serial system (a system in which a head ejects liquid toward an object of ejection while the head is being moved in a scanning direction parallel to the paper width direction).

The object of ejection is not limited to the paper sheet, and may be, for example, cloth, a substrate, etc.

The liquid ejected from the nozzles is not limited to the ink, and may be any liquid (e.g., a treatment liquid which agglutinates or precipitates a component of ink, etc.).

The present disclosure is applicable also to facsimiles, copy machines, multifunction peripherals, etc., without being limited to printers. Further, the present disclosure is applicable also to a liquid ejecting head used for any other application than the image recording (for example, a liquid ejecting head which forms an electroconductive pattern by ejecting an electroconductive liquid onto a substrate).

What is claimed is:

1. A liquid ejecting head comprising a channel structure having a first channel group, the first channel group including:

a supply channel extending in a first direction from one end thereof provided with a supply port;

a return channel extending in the first direction from one end thereof provided with a discharge port and arranged side by side with the supply channel in a second direction crossing the first direction;

a plurality of first individual channels aligned in the first direction, each of the first individual channels having a nozzle, one end communicating with the supply channel and the other end communicating with the return channel;

a second individual channel having one end communicating with the supply channel and the other end communicating with the return channel; and a connecting channel connecting the other end in the first direction of the supply channel and the other end in the first direction of the return channel, wherein the second individual channel has no nozzle and is configured to cause liquid to flow from the supply channel to the return channel, without causing the liquid to be ejected outside, and the second individual channel is positioned between the one end and the other end of the supply channel, and at least one of the first individual channels is positioned, in the first direction, between the second individual channel and the other end of the supply channel.

2. The liquid ejecting head according to claim 1, wherein the first channel group includes a plurality of second individual channels including the second individual channel.

3. The liquid ejecting head according to claim 1, wherein the channel structure further has a second channel group arranged side by side with the first channel group in a third direction crossing the first direction, the second channel group has at least the supply channel, the return channel, the first individual channels and the connecting channel, and a total number of the first individual channels and the second individual channel of the first channel group and a total number of the first individual channels and the second individual channel of the second channel group are same.

4. The liquid ejecting head according to claim 1, wherein the channel structure is constructed by stacking a plurality of plates, each of the first individual channels and the second individual channel are constructed by connecting holes each of which is formed in one of the plates, and the first individual channels and the second individual channel are aligned in the first direction at equal spacing distances therebetween.

5. The liquid ejecting head according to claim 1, wherein the first individual channels and the second individual channel are arranged, with respect to the supply channel, on one side in a third direction crossing the first direction.

6. The liquid ejecting head according to claim 1, wherein the first individual channels are arranged, with respect to the supply channel, on one side in a third direction crossing the first direction, and the second individual channel is arranged, with respect to the supply channel, on the other side in the third direction.

7. The liquid ejecting head according to claim 1, wherein the channel structure further has a second channel group arranged side by side with the first channel group in a third direction crossing the first direction, the second channel group has at least the supply channel, the return channel, the first individual channels and the connecting channel, the liquid ejecting head further comprises an actuator member fixed to a surface of the channel structure and having a plurality of actuators, each of the actuators is configured to apply energy, to the liquid inside the channel structure, by which the liquid is ejected from the nozzle, the actuators are arranged along the first direction to correspond to the first individual channels, respectively, the actuator member includes:

a piezoelectric layer;

a plurality of individual electrodes arranged on one surface of the piezoelectric layer and constructing the actuators; and a common electrode arranged on a surface, of the piezoelectric layer, opposite to the one surface, to face the individual electrodes, the common electrode has a contact point area to be connected to an electric power supplying part, the second channel group is separated from the contact point area farther than the first channel group, and a number of the second individual channel included in the first channel group is greater than a number of the second individual channel included in the second channel group.

8. The liquid ejecting head according to claim 1, wherein a difference between a first channel resistance from the one end to the other end in each of the first individual channels and a second channel resistance from the one end to the other end in the second individual channel is equal to or less than 10% of the first channel resistance.

9. The liquid ejecting head according to claim 1, wherein a shape of each of the first individual channels and a shape of the second individual channel are same.

10. The liquid ejecting head according to claim 1, wherein the second direction is orthogonal to a width direction, of the supply channel, which is orthogonal to the first direction.

* * * * *